United States Patent [19]
Cresswell et al.

[11] Patent Number: 5,905,712
[45] Date of Patent: May 18, 1999

[54] DATA COMMUNICATION NETWORK

[75] Inventors: Jason Cresswell, Slough; David Sinclair Ferguson, Hertfordshire, both of United Kingdom

[73] Assignee: Madge Networks Limited, Buckinghamshire, United Kingdom

[21] Appl. No.: 08/813,424

[22] Filed: Mar. 10, 1997

[30] Foreign Application Priority Data

Aug. 9, 1996 [GB] United Kingdom .................. 9616801

[51] Int. Cl.$^6$ ..................................................... H04L 12/56
[52] U.S. Cl. ............................ 370/238; 370/401; 370/465
[58] Field of Search .................................. 370/235, 238, 370/248, 252, 400, 401, 402, 403, 404, 405, 432, 463, 465

[56] References Cited

U.S. PATENT DOCUMENTS

| | | | |
|---|---|---|---|
| 4,873,517 | 10/1989 | Baratz et al. | 370/238 |
| 5,233,604 | 8/1993 | Ahmadi et al. | 370/238 |
| 5,317,566 | 5/1994 | Joshi | 370/238 |
| 5,323,394 | 6/1994 | Perlman | 370/238 |
| 5,398,012 | 3/1995 | Derby et al. | 370/238 |
| 5,596,719 | 1/1997 | Ramakrishnan et al. | 370/238 |
| 5,699,347 | 12/1997 | Callon | 370/238 |
| 5,805,593 | 9/1998 | Busche | 370/238 |

FOREIGN PATENT DOCUMENTS 0 464 680 A3   1/1992   European Pat. Off. ........ H04L 12/56

OTHER PUBLICATIONS

Catania, V. et al., "A Routing Strategy for Man Interconnection," *Networking in the Nineties,* Bal Harbour, Apr. 7–11, 1991, vol. 2, Apr. 7, 1991, Institute of Electrical and Electronics Engineers, pp. 608–615.

Dixon, Roy C. et al., "Addressing, Bridging, and Source Routing," *IEEE Network: The Magazine of Computer Communications,* vol. 2, No. 1, Jan. 1988, pp. 25–32.

European Search Report, dated Mar. 25, 1997.

*Primary Examiner*—Chi H. Pham
*Assistant Examiner*—Ricky Q. Ngo
*Attorney, Agent, or Firm*—Sughrue, Mion, Zinn, Macpeak & Seas, PLLC

[57] ABSTRACT

A data communication network having a number of end stations connected together for data communication therebetween. At least one network interconnect device receives and transmits data packets. The network interconnect device further includes a memory and a processor, each end station and network interconnect device being adapted to transmit data in accordance with a protocol in which copies of a route recording data packet are transmitted along multiple routes through the network. The memory of the network interconnect device is adapted to store information relating to the manner in which route recording data packets reach the network interconnect device. The processor compares the manner in which a currently received route recording data packet has reached the network interconnect device with information stored in the memory corresponding to a previously received version of the route recording data packet and only forwards the currently received route recording data packet if the comparison indicates a predetermined condition is satisfied.

13 Claims, 1 Drawing Sheet

DATA COMMUNICATION NETWORK

FIELD OF THE INVENTION

The invention relates to a data communication network having a number of end stations connected together for data communication therebetween.

DESCRIPTION OF THE PRIOR ART

The invention is primarily concerned with local area networks but is also applicable to other types of network and is concerned with the operation of a network communication protocol in which route recording data packets or frames are sent along multiple paths. This approach is used in networks such as token ring source routing networks (All Routes Broadcast) and IPX Type 20 packets in routed networks (NETBIOS broadcasts).

In source routed token ring networks, All Routes Broadcasts are used to find the best path between two points in the network, normally based on the smallest number of bridge hops and/or the shortest transit time. In this context, a bridge is a network interconnect device which links to subsidiary networks such as subsidiary self-contained token rings. Network interconnect devices also include routers which transfer data packets between networks of different type, e.g. token ring and ethernet and in this context extends to any device which connects different parts of a network.

IPX Type 20 packets in routed networks are used to broadcast data throughout a group of IPX networks via routers. In this context, a router is a network interconnect device which links separate networks such as ethernets and token rings.

Networking protocols attach auditing information to route recording data packets (known as All Routes Explorer—ARE packets) as they cross the network, such as a count of the number of devices they have crossed, or even identifiers of the devices they have crossed, in order to prevent the endless recirculation and duplication of AREs through the network in what is sometimes known as a "Broadcast Storm". For example, IPX NETBIOS broadcasts keep a record of each IPX network they have crossed, and source route token ring bridges keep a record in the AREs, of both the unique Ring Numbers, together with an indication of which bridge was crossed between two rings. The protocols have default limits to the number of devices that can be crossed, after which the broadcast packets must be discarded.

If information about the particular devices crossed in the network is available in the auditing information, then devices often implement mechanisms to prevent broadcasts passing through the same device or network location twice, which reduces the number of paths in the network considerably.

Some devices such as source route token ring bridges can impose reductions of the limits on the number of devices that can be crossed, and discard AREs before they reach the default limit of the protocol. These reductions are referred to herein as Static Hop Count Limits.

Careful configuration of Static Hop Count Limits on the various connections in the network can dramatically reduce the number of copies of AREs produced in the network.

There are several problems with Static Hop Count Limits:

Firstly, it can be difficult to define appropriate Static Hop Count Limits in a complex network as there are so many possible routes to consider and low values of the Static Hop Count Limits could cause communication between distant parts of the network to be impossible.

Secondly, any Static Hop Count Limits will reduce the number of active paths available in the network should interconnect devices in the network become inoperative for any reason.

Thirdly, unless Static Hop Count Limits are reduced to very low values, the number of routes in a complex mesh network, and hence the duplication levels of AREs, will remain very high.

SUMMARY OF THE INVENTION

In accordance with the present invention, a data communication network has a number of end stations connected together for data communication therebetween, and at least one network interconnect device for receiving and transmitting data packets, the network interconnect device further including a memory and processing means, each end station and network interconnect device being adapted to transmit data in accordance with a protocol in which copies of a route recording data packet are transmitted along multiple routes through the network, wherein the memory of the network interconnect device is adapted to store information relating to the manner in which route recording data packets reach the network interconnect device, and wherein the processing means compares the manner in which a currently received route recording data packet has reached the network interconnect device location with information stored in the memory corresponding to a previously received version of the route recording data packet and only forwards the currently received route recording data packet if the comparison indicates a predetermined condition is satisfied.

With this invention, the network interconnect device stores information relating to the manner in which different types of route recording data packets reach the interconnect device. Thus, a global limit, for example a hop count limit, applicable to all source locations is replaced by a limit for each of two or more types of route recording data packets. In this way, it is possible to optimise the limits depending upon the type of route recording data packet.

Typically, the different types of route recording data packet will originate from different source locations but in some cases they could be generated by the same source location.

The previously received version of the route recording data packet may be a copy of the original route recording data packet but is more likely to be a modification if it includes auditing information relating to its passage through the network.

The network interconnect device will typically be a bridge or router but could simply be a filter placed within a network.

The source location will typically be an end station or ring.

The invention can be implemented in a variety of ways depending upon the auditing information available within the route recording data packets and the reduction of paths required.

In one example, the information stored in the memory defines a time for a route recording data packet to reach the network interface device from a source location.

In this example, typically the predetermined condition is satisfied if the time for the currently received route recording data packet to reach the network interconnect device from the source location is not greater than the corresponding stored time. Thus, only the route recording data packets which have reached the network interconnect device quickest are forwarded. Of course, other predetermined conditions could be applied instead depending upon the circumstances.

In another example, the information stored in the memory defines the number of locations on the network through which the route recording data packet has passed before reaching the network interconnect device.

In this case, a hop count is kept for two or more types of route recording data packets and in the preferred approach, the predetermined condition is satisfied if the number of locations through which the route recording data packet has passed is not greater than the number stored in the memory corresponding to a previously received version of the route recording data packet of the same type.

The second example can be extended and, for example, the processing means may be adapted to determine and store in the memory information identifying some or all locations through which the route recording packet has passed to reach the network interconnect device. In this case, the processing means may be adapted only to forward received route recording data packets which have passed through locations corresponding to the locations stored in the memory for a previously received version of the route recording data packet.

In a further development, the processing means may be adapted to determine and store the locations in the order in which they have been passed through by the route recording data packet. In this case, the processing means will only forward route recording data packets which have passed through the locations in the same, stored order.

Lists of previous locations visited by a route recording data packet are available in applications such as IPX NET-BIOS broadcasts, token ring source routing All Routes Broadcasts and emulated LAN for ATM networks.

Other audit information in the route recording data packet may also be used to choose the best route from the source location. For example, if the audit information contains information about the relative costs of each path, this could be used instead of, or in addition to, the lowest number of hops and the order of arrival, as a metric for choosing the best path from the source location.

In a particularly preferred application, the processing means is adapted to update the information stored in the memory relating to a route recording data packet with information related to the currently received version of that route recording data packet if the currently received route recording data packet has reached the network interconnect device via a more efficient route.

This application enables the stored information to be dynamically updated in complete contrast to the known, static systems. This then enables networks rapidly to be optimised in handling route recording data packets and minimises the risks of fault conditions such as broadcast storms.

Efficiency can be judged in a variety of ways but will typically include one or more of lowest number of hops, shortest transit time from source location, and lowest cost route.

In a further refinement, the processing means is adapted to determine and store in the memory data identifying the port on which a route recording data packet was received which corresponds to information stored in the memory for that route recording data packet, the processing means only forwarding versions of that route recording data packet received on the same port. The advantage of this is that it requires no further auditing information within the route recording data packet but reduces the number of paths significantly for multiple port network interconnect devices.

The previous mechanisms work well in an environment that does not have other protocol specific filters active on interconnect devices. If other filters are active in the network, they may allow some route recording data packets or frames to cross the shortest paths, while others are only allowed to follow spanning tree or other limited paths. To prevent the discard of such frames that do not cross the cached shortest paths, it is necessary to apply the invention on a frame by frame basis.

Sufficient information about each frame must be stored to distinguish between two frames from the same location that have only very limited differences in content. One way to achieve this is to cache a 32-bit CRC check of each frame and to use this to differentiate between frames from the same location. The likelihood of two different frames, from the same location, having the same 32-bit CRC check, and being filtered through different paths is extremely remote. The rate of frames lost due to identical CRC checks is likely to lower than physical corruption losses, and can be recovered from by higher level protocols.

In an alternative approach to allow, for example, for changes in network configuration which could result in removal of the path corresponding to the stored information, the processing means preferably erases the information after a predetermined time interval. This would also allow a source location to transmit along the quickest path even if this did not correspond to the path with the smallest number of hops, where hop count was stored.

BRIEF DESCRIPTION OF THE DRAWINGS

Some examples of networks and methods of operating the networks according to the invention will now be described with reference to the accompanying drawings, in which.

DETAILED DESCRIPTION OF THE EMBODIMENTS

Figure 1:
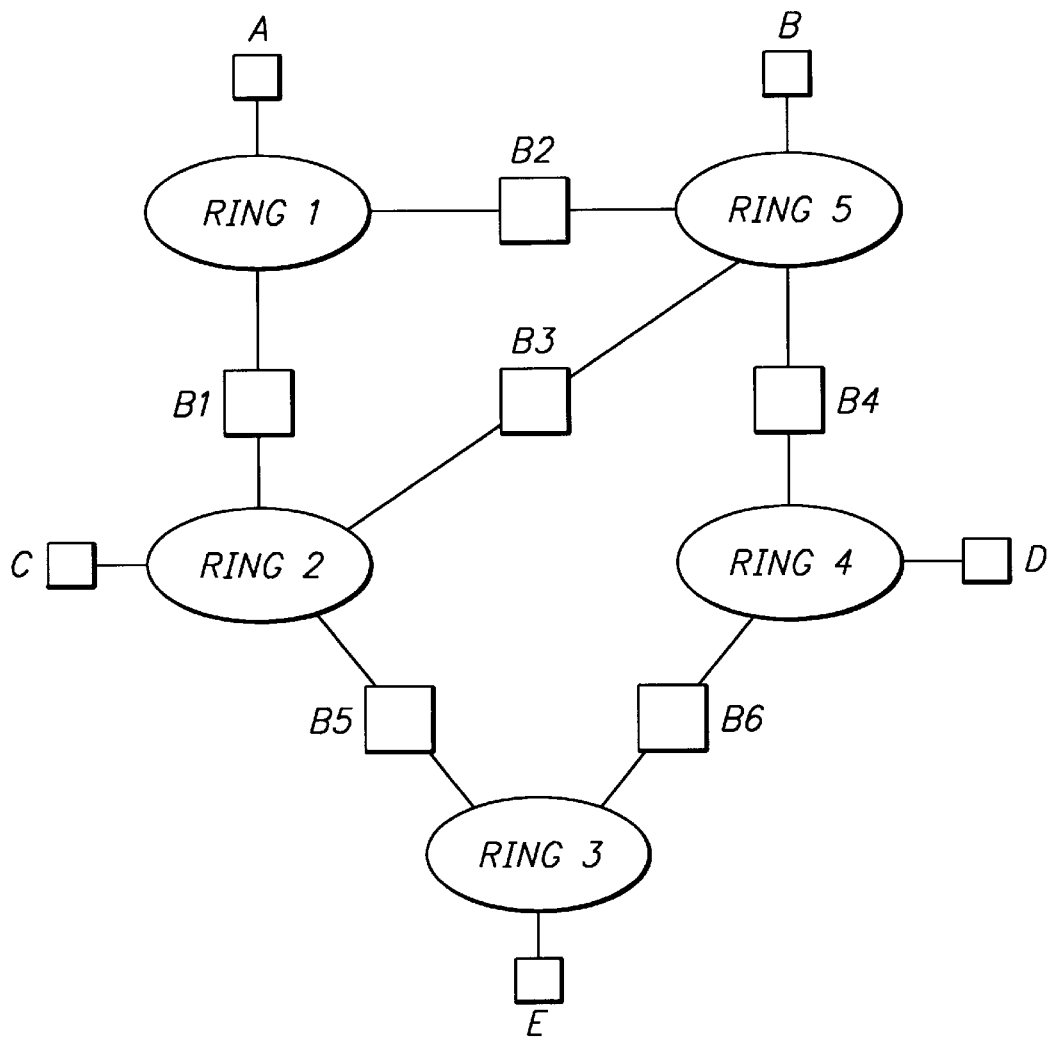
FIG. 1 is a schematic illustration of a local area network based on a token ring protocol.

The network shown in FIG. 1 comprises five token rings 1–5 linked together, as shown, by bridge units B1–B6. Each token ring has a number of end stations some of which are shown labelled A–E. This configuration of token ring networks is conventional and as in any conventional token ring, the end stations can have a variety of forms including, for example, PCs. Data can be transmitted from one token ring to another via one or more of the bridge units B1–B6.

Figure 2:
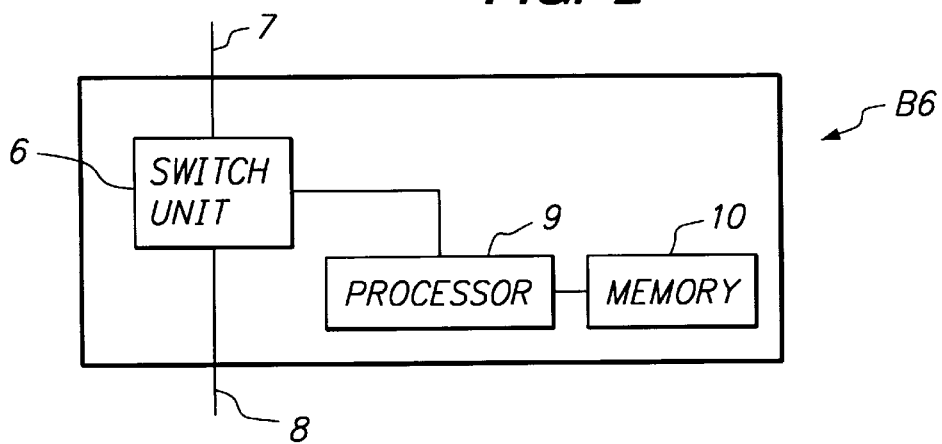
FIG. 2 is a block diagram of a token ring bridge.

The construction of the bridge unit B6 is shown in FIG. 2. The unit includes a switch unit 6 having ports 7,8 connected to the token rings 3,4 respectively. Operation of the switch unit 6 is controlled by a suitably programmed processor 9 coupled to a memory 10. If the processor 9 determines that an incoming data frame should be copied from one token ring to the other, it will effect a suitable connection of the ports 7,8, via the switch unit 6 to achieve this.

When an end station wishes to transmit a data frame to one or more other end stations then, in the case of a token ring operating an all routes broadcast protocol, the source end station first constructs a route recording data packet or All Routes Explorer (ARE) and broadcasts this to the network as a whole. For example, if the end station A wishes to transmit to the end station E, it will construct an All Routes Explorer (ARE) having a source address A and a destination address E and this will be transmitted around the token ring 1. When the ARE reaches the bridge B1, it will be copied onto the token ring 2 and a further copy will be transferred onto the token ring 5 via bridge B2. As the ARE circulates around the token rings 2,5, each copy will be copied again by bridge B3 onto token rings 5 and 2 respectively, as well as being copied by bridges B4,B5 onto the token rings 4,3. Table 1 lists the different possible routes for an ARE transmitted from end station A.

Typically, each bridge will append audit information to the copies of the AREs which are made, for example identifying the bridge.

It can be seen from this description that in a complex network, AREs can be multiplied to such an extent that a significant load on the destination end stations network can occur. Table 2 lists the number of copies of an ARE that will be transmitted onto token rings 1 to 5. In the past, in an attempt to reduce this problem, each bridge unit B1–B6 has included "static hop count" values for each port which are stored in the memories 10. The processing means 9 then compares the number of "hops" corresponding to passages through bridge units recorded in an incoming ARE and if this number exceeds the stored value for the incoming port then the ARE is not copied onto other rings. The problems of this approach have been discussed above.

In a first example of the present invention, the memory 10 instead records a hop count corresponding to each route recording data packet. When a first copy of an ARE is received, the processing means 9 notes the hop count value contained within the ARE and this value is loaded into the memory 10 at a location corresponding to the ARE. Thus, in the case of the bridge B6, the first ARE from end station A is likely to have passed through bridges B1 and B5 and so a hop count value of two is stored in the memory 10.

Subsequently, the bridge unit B6 may receive a further copy of the ARE from the end station A which has passed along a different route, for example through bridges B1, B3 and B4. This will, therefore, include within it a hop count value of three. The processing means 9 compares the incoming hop count value with the stored value and since in this case the current value is greater than the stored value, the switch B6 will not pass the incoming ARE onto R3.

During use, the memory 10 in each of the bridges B1–B6 will be built up with hop count values corresponding to each route recording data packet. However, the processor 9 will typically operate a time-out to cancel the stored value a predetermined interval after it was stored.

If for some reason the currently stored hop count value for a particular packet in the memory 10 is greater than the hop count contained in an incoming copy of that ARE, then the stored value is replaced by the incoming value so as to optimise use of the system and minimise the passage of AREs which have reached the bridge unit through less optimum paths.

In a second example, the memory 10 may further store the identity of the bridge units through which the ARE has passed to reach it. For example, in the case just described, if the first ARE received from the end station A has passed through bridge units B1 and B5, the identity of these two bridge units will be recorded in the memory 10 of B6. If subsequently a further version is received which has passed through bridge units B2 and B4, this will not be forwarded since the identities of the bridge units are different from those stored. It will be noted in this case that in both cases the hop count of the incoming ARE is two.

In a refinement of this method, the processor 9 could require the incoming ARE to have passed through the bridge units in the order in which they have been stored.

In an alternative approach, if the ARE contains data defining the time at which it was launched by the initiating end station, the processor 9 can store in the memory 10 a value representing the time it has taken for the ARE to reach the bridge unit. This time can then be compared with times of successively received versions and only those having a time not greater than the stored time will be passed. Further, if an ARE has a time less than that stored, this can be used to update the stored value. It is possible, in some cases, for versions to be received at a bridge unit more quickly than another ARE from the same end station even though the first may have passed through more bridge units.

In a further example which can be used additionally to any of the examples described above, but which does not require further audit information on the incoming ARE, the memory 10 can store information as to which port 7,8 received the ARE corresponding to the information which is stored in the memory 10. Thus, if a hop count is stored in the memory 10 corresponding to an ARE received on port 7, then the processor 9 will only forward versions satisfying the stored hop count if additionally they have been received on the same port 7.

TABLE 1

| Originating End Station | Route of ARE |
| --- | --- |
| A | R1,B1,R2,B5,R3,B6,R4,B4,R5 |
| A | R1,B2,R5,B4,R4,B6,R3,B5,R2 |
| A | R1,B2,R5,B3,R2,B5,R3,B6,R4 |
| A | R1,B1,R2,B3,R5,B4,R4,B6,R3 |

TABLE 2

| Ring Number | Copies |
| --- | --- |
| R1 | 1 |
| R2 | 3 |
| R3 | 4 |
| R4 | 4 |
| R5 | 3 |

We claim:

1. A data communication network having a number of end stations connected together for data communication therebetween, and at least one network interconnect device for receiving and transmitting data packets, the at least one network interconnect device further including a memory and a processor, each end station and network interconnect device being adapted to transmit data in accordance with a protocol in which copies of a route recording data packet are transmitted along multiple routes through the network, wherein said memory of said at least one network interconnect device is adapted to store information relating to the manner in which route recording data packets reach said at least one network interconnect device, and wherein said processor compares the manner in which a currently received route recording data packet has reached said at least one network interconnect device with information stored in said memory corresponding to a route recording data packet which has been previously received from the same source location and only forwards the currently received route recording data packet if the comparison indicates a predetermined condition is satisfied.

2. A network according to claim 1, wherein the information stored in said memory defines a time for a route recording data packet to reach said at least one network interconnect device from a source location.

3. A network according to claim 2, wherein said predetermined condition is satisfied if the time for the currently received route recording data packet to reach said at least one network interconnect device from said source location is not greater than the time for the previously received route data packet to reach said network interconnect device.

4. A network according to claim 1, wherein the information stored in said memory defines the number of locations on the network through which the route recording data packet has passed before reaching said at least one network interconnect device.

5. A network according to claim 4, wherein said predetermined condition is satisfied if the number of locations through which the route recording data packet has passed is not greater than the number stored in said memory corresponding to a previously received version of the route recording data packet.

6. A network according to claim 4, wherein said locations are defined by network interconnect devices.

7. A network according to claim 1, wherein said processor is adapted to determine and store in said memory information identifying some or all locations through which the route recording data packet has passed to reach said at least one network interconnect device.

8. A network according to claim 7, wherein said locations are stored in the order in which they have been passed through by the route recording data packet.

9. A network according to claim 7, wherein said processor only forwards received route recording data packets which have passed through locations corresponding to the locations stored in said memory for the previously received version of the route recording data packet.

10. A network according to claim 1, wherein said processor is adapted to update the information stored in said memory relating to a route recording data packet with information related to the currently received version of that route recording data packet if the currently received route recording data packet has reached said at least one network interconnect device via a more efficient route.

11. A network according to claim 1, wherein said processor is adapted to determine and store in said memory data identifying the port on which a route recording data packet was received which corresponds to information stored in said memory for that route recording data packet, said processor only forwarding versions of that route recording data packet received on the same port.

12. A network according to claim 1, wherein said network protocol comprises one of token ring and IPX.

13. A network according to claim 1, wherein said memory stores information for route recording data packets from more than one source location.

\* \* \* \* \*